United States Patent [19] [11] Patent Number: 4,951,077
Kaneko et al. [45] Date of Patent: Aug. 21, 1990

[54] METHODS AND DEVICE FOR MEASURING THE BRIGHTNESS OF AN OBJECT

[75] Inventors: Koji Kaneko; Kazuhisa Seki; Kazutsugu Ogata; Satoshi Mikajiri, all of Omiya, Japan

[73] Assignee: Fuji Photo Film Co., Ltd., Kanagawa, Japan

[21] Appl. No.: 409,860

[22] Filed: Sep. 20, 1989

[30] Foreign Application Priority Data

Oct. 7, 1988 [JP] Japan ................................ 63-253142

[51] Int. Cl.$^5$ .............................................. G03B 13/00
[52] U.S. Cl. .................................. 354/400; 354/410; 354/421
[58] Field of Search ............... 354/410, 412, 400–409, 354/420, 421, 422

[56] References Cited

U.S. PATENT DOCUMENTS 4,285,585  8/1981  Numata ................................ 354/421
4,724,455  2/1988  Suzuki et al. ....................... 354/421

Primary Examiner—L. T. Hix
Assistant Examiner—David M. Gray
Attorney, Agent, or Firm—Sughrue, Mion, Zinn, Macpeak & Seas

[57] ABSTRACT

Method and device for measuring the brightness of an object in photographing the object in flash synchronization by use of an AE sensor capable of averaged overall light reading. In the method and device, in accordance with the distance of the object and also with the focal distance of a taking lens, an area occupied by a main object or a ratio of the occupation area on the light receiving surface of the AE sensor is estimated. Then, in accordance with said estimated occupation area or occupation area ratio of the main object and also with a measurement brightness $Bv_{(AV)}$ measured by the AE sensor, there is found a brightness correction value $\Delta Bv$ which provides a value that increases as the occupation area of the main object increases and the measurement brightness $Bv_{(AV)}$ measured by the AE sensor increases. Further, the thus obtained brightness correction value $\Delta Bv$ is added to the measurement brightness $Bv_{(AV)}$ by the AE sensor to thereby find an object brightness.

8 Claims, 5 Drawing Sheets

METHODS AND DEVICE FOR MEASURING THE BRIGHTNESS OF AN OBJECT

BACKGROUND OF THE INVENTION

1. Field of the Invention

The present invention relates to method and device for measuring the brightness of an object and, in particular, to such method and device for measuring the brightness of an object in photographing the object in flash synchronization using an AE sensor for averaged overall light reading.

2. Description of the Related Art

To measure the brightness of an object, there are available two methods, that is, a spot light reading method and an averaged overall light reading method. The spot light reading method is a method in which the brightness of a main object and the brightness of the background are measured individually and an amount of exposure is determined in accordance with the respective measured brightnesses. This method is advantageous in that, when the brightness of the main object is different from the brightness of the background, an accurate brightness can be measured, for example, even in back light.

On the other hand, the averaged overall light reading method is a method of finding an averaged value of the brightnesses of a whole range on the screen. The averaged overall light reading method is advantageous over the spot light reading in that it requires only one sensor for light measurement.

However, the above-mentioned averaged overall light reading method has a disadvantage that, if there exists in a part of the screen a bright spot having a great brightness difference, then the exposure is short under the influence of such spot. For example, in the case of back light, while the background brightness is high, the main object is low in brightness since it is in the shade. As a result of this, the difference between the background and main object brightness is large and, therefore, if the averaged overall light reading method is used, then the picture is taken under a condition having an intermediate brightness between the background and main object brightnesses, with the result that the main object is short of exposure while the exposure of the background is excessive.

In view of this, in the case of back light, to solve the short exposure of the main object, a strobe is used to give forth light, that is, a so called day light flash synchronization is used. However, in the averaged overall light reading method with the day light flash synchronization, the background is exposed too much because the brightnesses between the main object and background are not distinguished from each other due to use of only one sensor, while the entire screen is exposed too much because the main object is radiated not only by the strobe light as an auxiliary light but also by the natural light. For this reason, in general, a photographer himself or herself must decide the photographic conditions and correct the exposure.

SUMMARY OF THE INVENTION

The present invention aims at eliminating the drawbacks found in the above-mentioned prior art methods and devices.

Accordingly, it is an object of the invention to provide method and device for measuring the brightness of an object, in which, for an object to be photographed by means of the flash synchronization using the averaged overall light reading method, the brightness measured by the averaged overall light reading method can be corrected according to the area on the light receiving surface of an AE sensor occupied by a main object so that the background adjacent to the main object can be exposed properly, and the exposure dependency of the main object on a strobe light can be increased, whereby the whole screen can be exposed properly to ensure excellent photographing.

In order to achieve this object, according to the invention, there is provided a method for measuring the brightness of an object in photographing the object in flash synchronization by use of an AE sensor performing averaged overall light reading, in which the area on the light receiving surface of the AE sensor occupied by a main object or a ratio of the area occupied by the main object is estimated in accordance with the distance of the object and lens focal distance, a brightness correction value $\Delta B_V$ is found in accordance with the estimated area or area ratio of the main object and the measured brightness $B_{V(AV)}$ of the AE sensor, which brightness correction value is increased as the area of the main object is increased as well as the measured brightness $B_{V(AV)}$ is increased, and the brightness correction value $\Delta V_V$ thus found is added to the measured brightness by the AE sensor to find the brightness $B_V$ of the object.

According to the invention, in photographing in flash synchronization, for example, when the above-mentioned measured brightness $B_{V(AV)}$ of the AE sensor is large and the occupation area of the main object on the light receiving surface of the AE sensor is also large, it is decided as day light flash synchronization and thus, in this case, the brightness correction value $\Delta B_V$ is added to the measured brightness $B_{V(AV)}$ of the AE sensor to thereby prevent excessive exposure. Here, the occupation area of the main object on the light receiving surface of the AE sensor is estimated from the object distance and lens focal distance. Also, the above-mentioned brightness correction value is increased as the area of the main object is increased and the measured brightness $B_{V(AV)}$ of the AE sensor is increased.

BRIEF DESCRIPTION OF THE DRAWINGS

The exact nature of this invention, as well as other objects and advantages thereof, will be readily apparent from consideration of the following specification relating to the accompanying drawings in which like reference characters designate the same or similar parts throughout the FIGURES thereof and wherein.

DETAILED DESCRIPTION OF THE INVENTION

Detailed description will hereunder be given of the preferred embodiment of method and device for measuring the brightness of an object according to the present invention with reference to the accompanying drawings.

At first, a method of measuring the brightness of an object will be described in principle with reference to FIGS. 3 and 4.

In general, in the case of back light, day light flash synchronization is carried out. In this case, since a main object is radiated by both natural light and strobe flash light, the main object is exposed too excessively and likewise the background is exposed too much. Therefore, in such case, a brightness correction value $\Delta B_V$ is added to the measured brightness $B_{V(AV)}$ of an AE sensor for detecting and reading the averaged overall light to obtain a brightness value ($B_V$) so as to prevent excessive exposure.

Figure 3:
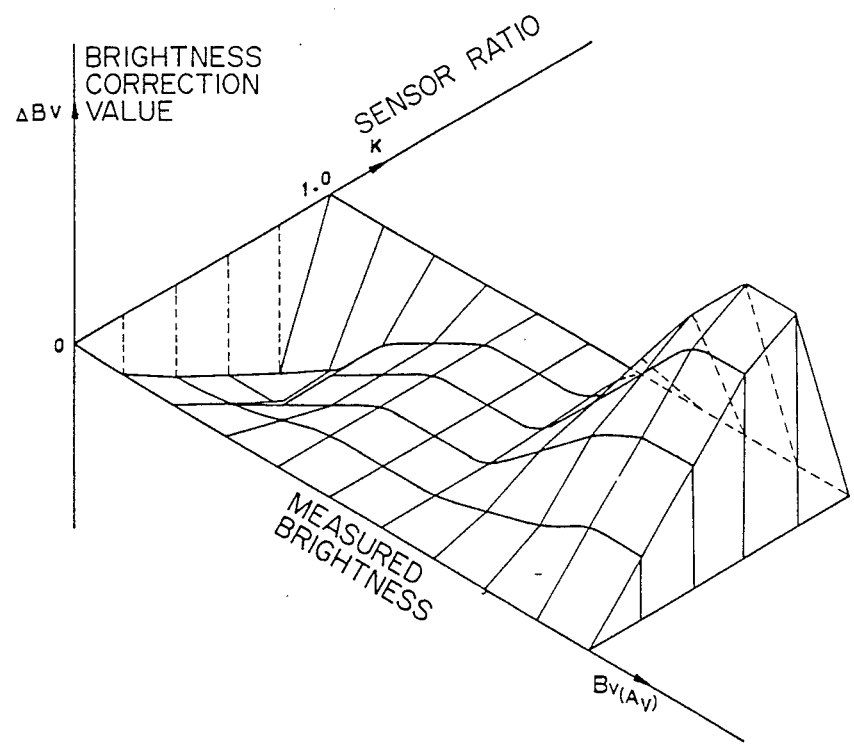
FIG. 3 is a graphical representation to illustrate brightness correction values using measured brightnesses and sensor ratios as parameters.

Now, the above-mentioned brightness correction value $\Delta B_V$, as shown by a graph in FIG. 3, is determined by the measured brightness $B_{V(AV)}$ of the AE sensor and the ratio of the area occupied by the main object on the light receiving surface of the AE sensor (which is referred hereinafter as a sensor ratio) K, as parameters. That is, the brightness correction value $\Delta B_V$ is increased as the measured brightness $B_{V(AV)}$ is increased and as the sensor ratio K is increased. For the same measured brightness $B_{V(AV)}$, the brightness correction value $\Delta B_V$ takes a peak value when the sensor ratio K is 0.8 and also the upper limit of the brightness correction value $\Delta B_V$ is set to be, for example, 2 or less.

In other words, for daylight flash synchronization photographing, the measured brightness $B_{V(AV)}$ is greater when compared with that in the normal flash synchronization photographing. Also, when the sensor ratio K is large, the AE sensor is easily affected by the contrast difference between the main object and background and, in such case, the day light flash synchronization is used. Therefore, in the flash synchronization photographing, when the measured brightness $B_{V(AV)}$ is large and the sensor ratio K is also large, then the photographing is decided as the day light flash synchronization photographing and thus, as discussed before, the measured brightness $B_{V(AV)}$ is corrected by use of the brightness correction value $\Delta B_V$ to thereby prevent excessive exposure. On the other hand, as shown in FIG. 3, when the measured brightness $B_{V(AV)}$ is small and the sensor ratio K is large, then the measured brightness $B_{V(AV)}$ is corrected by the brightness correction value $\Delta B_V$ having an opposite polarity to the above-mentioned case to thereby prevent short exposure.

Figure 4:
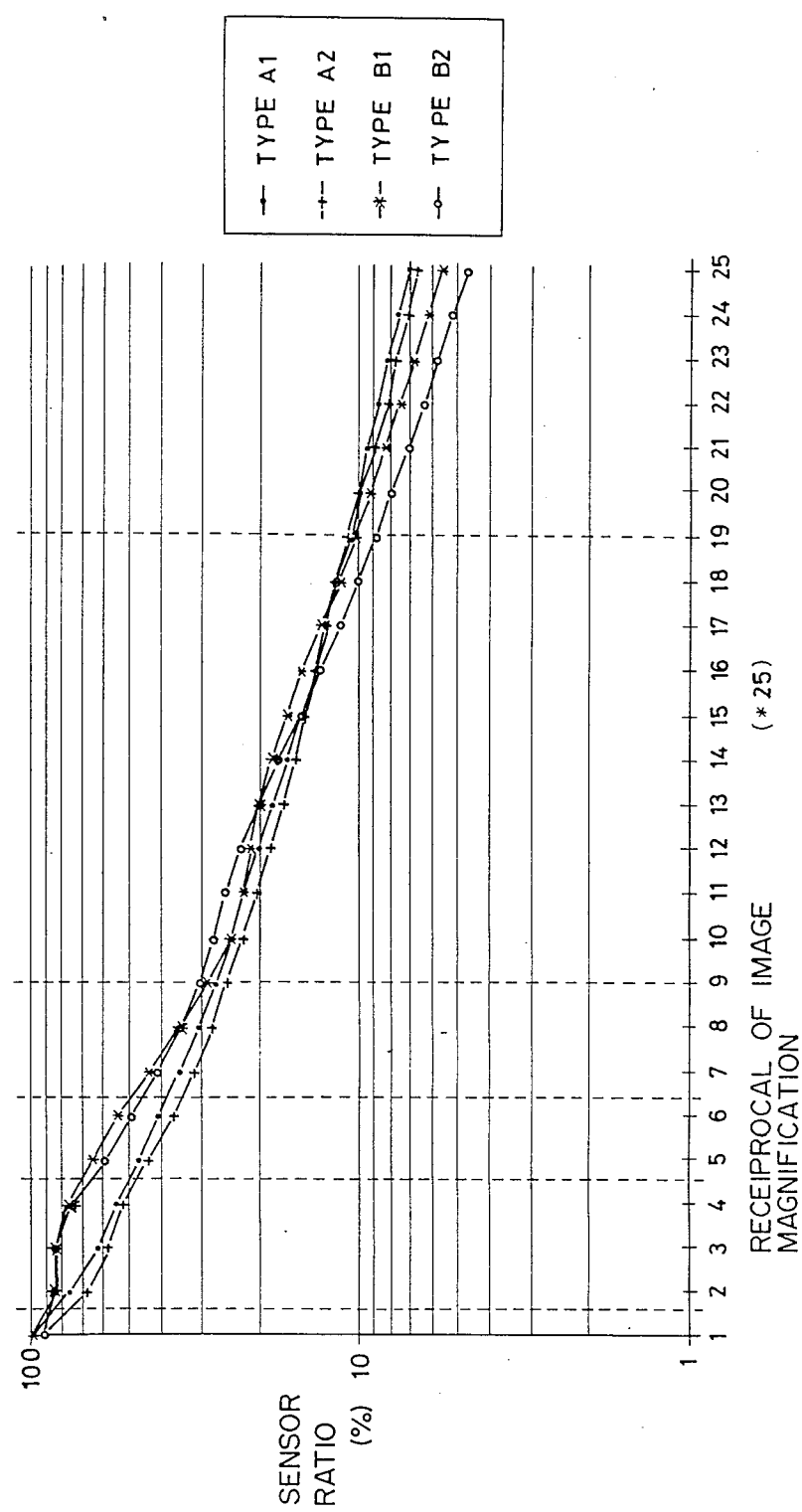
FIG. 4 is a graphical representation to illustrate the relation between the sensor ratio and image formation ratio; and, FIG. 5 is a program representation used to select shutter speeds or time values ($T_V$) from $E_V$ values and aperture values ($A_V$).

Now, the sensor ratio, as shown by a graph in FIG. 4, has a given correlation to an image magnification (a reciprocal number of the image magnification). Therefore, the sensor ratio can be found by calculating the image magnification. The image magnification can be calculated in accordance with the distance of an object and the lens focal distance, as shown by the following equation:

$$\text{Image magnification} = \frac{\text{Object Distance} - \text{Focal Distance}}{\text{Focal Distance}}$$

Figure 2:
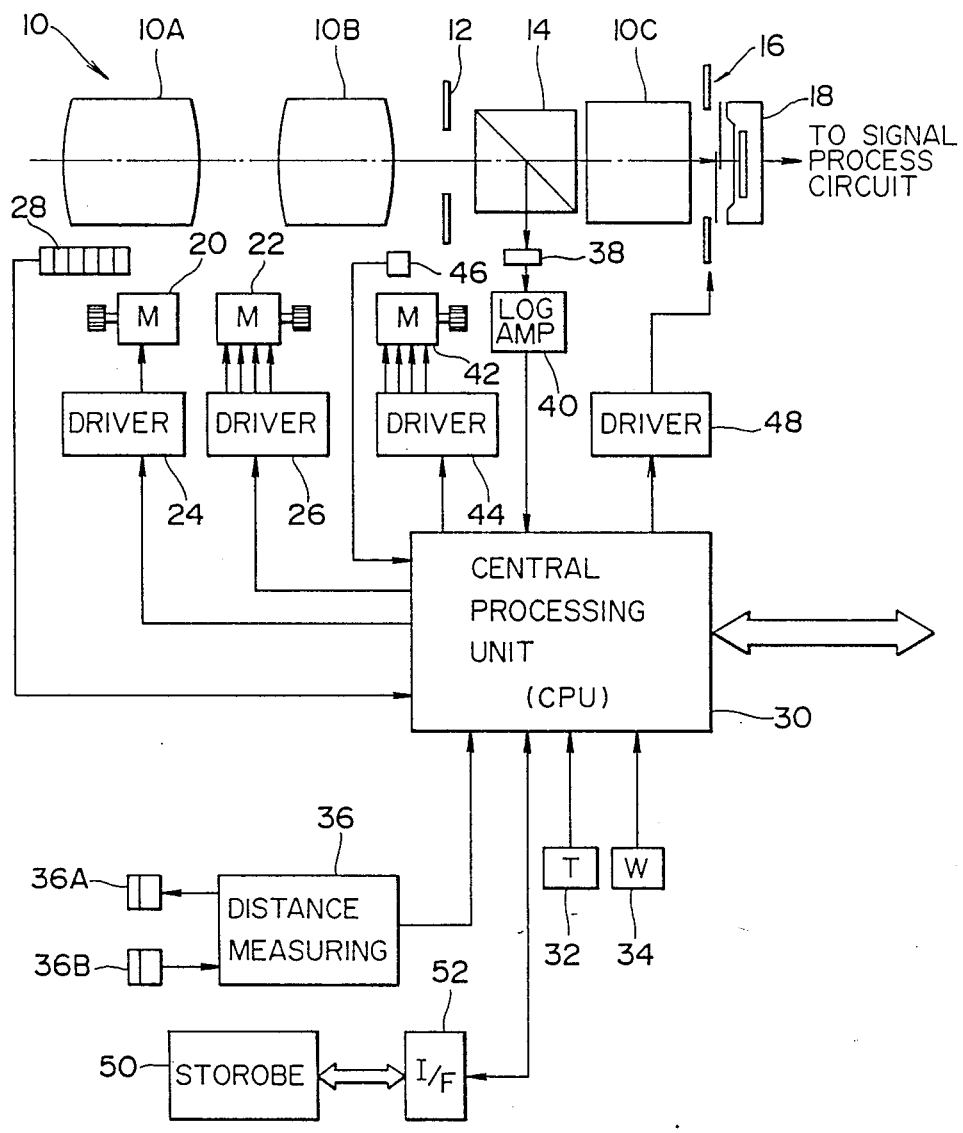
FIG. 2 is a block diagram of a camera to which the invention is applied.

Now, referring to FIG. 2, there is shown a block diagram of a camera to which a method of measuring the brightness of an object according to the present invention is applied, in which there is illustrated an electronic still camera having a zoom lens.

In FIG. 2, reference numeral 10 designates a zoom lens, 12 a diaphragm, 14 a beam splitter, 16 a shutter and 18 a CCD.

The zoom lens 10 comprises a magnification varying part 10A, a focusing part 10B and a fixed part 10C. An image of an object which passes through the zoom lens 10 is varied in magnification in the magnification varying part 10A, is adjusted in focus in the focusing part 10B, and is formed through the fixed part 10C onto the light receiving surface of the CCD 18.

The magnification varying part 10A and focusing part 10B of the above-mentioned zoom lens 10 can be moved by a zoom drive motor 20 and a focus drive motor 22, respectively. In other words, if a signal is applied to a central processing unit (CPU) 30 from a tele button 32 or a wide button 34, then the CPU 30 outputs a tele instruction or a wide instruction to the zoom drive motor 20 through a drive 24 to thereby rotate the zoom drive motor 20 forwardly or reversedly. And, by means of the rotation of the zoom drive motor 20, the magnification varying part 10A is moved to thereby change the focal distance of the zoom lens 10. The position of the magnification varying part 10A of the zoom lens 10 is detected by a zoom position detector 28 and a signal representing a zoom position (a lens focal distance) is output from the detector 28 to the CPU 30.

On the other hand, a distance measuring part 36 employs an active type of trigonometrical measurement and in this measuring part 36, infrared light is projected from a light projector element 36A onto an object, the infrared light that is reflected by the object is guided into a light receiving element (composed of two SPDs) 36B, a distance to the object is measured in accordance with the ratio of outputs of the two SPDs, and the resultant object distance information is output to the CPU 30. Responsive to this, the CPU 30 outputs through a driver 26 to the focus drive motor 22 a signal which corresponds to the object distance information input from the distance measuring part 36, whereby the focusing part 10B is moved so that the object image can be in focus.

Also, the AE sensor 38 is used to measure the brightness of the object in an averaged overall light reading manner. In particular, the AE sensor 38 receives the light that is divided by the beam splitter, and outputs a signal corresponding to the amount light received to the CPU 30 through a logarithmic amplifier 40. That is, a measured brightness signal representing the brightness value $B_{V(AV)}$ is applied from the logarithmic amplifier 40 to the CPU 30. In accordance with the above-mentioned measured brightness signal, the CPU 30 program controls the diaphragm 12 and shutter 16 automatically. That is, the diaphragm 12 is controlled or changed to given aperture positions in a stepwise manner by a diaphragm drive motor 42, a driver 44 and an aperture position sensor 46, and the shutter 16 is controlled such that the shutter speeds thereof are continuously controlled according to a signal applied thereto through a driver 48.

Further, the CPU 30 inputs through an interface 52 a signal whether a strobe light 50 is mounted to the camera or not, and outputs through the interface 52 a signal for controlling the light emitting level of the strobe light and a light emitting trigger for causing the strobe light 50 to give forth light.

And, the CPU 30, when the strobe light 50 is mounted to the camera, that is, when performing the flash synchronization photographing, program controls the diaphragm 12 and shutter 16, which will be discussed herein later.

Figure 1:
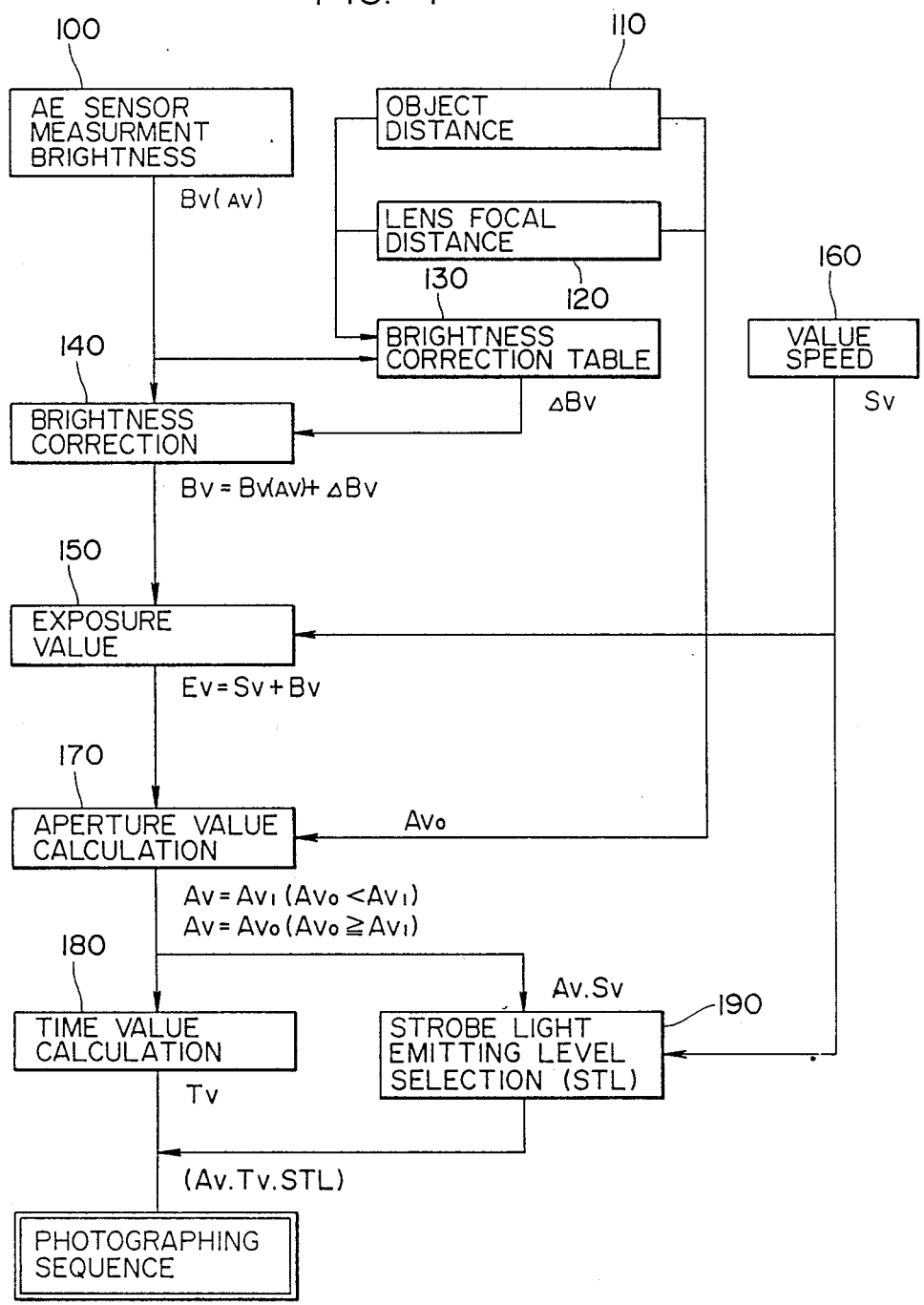
FIG. 1 is a flow chart to show procedures used to calculate aperture values ($A_V$) and shutter speeds or time values by use of a method of measuring the brightness of an object according to the invention.

Now, in FIG. 1, there is shown a flow chart to illustrate processing procedures for calculation of aperture values and shutter speeds or time values in the flash synchronization photographing.

As shown in FIG. 1, inputs the information that represents the measured brightness $B_{V(AV)}$, object distance and lens focal distance from the AE sensor 38, distance measuring part 36 and zoom position detector 28 (FIG. 2) (Steps 100, 110, 120). The CPU 30 has a brightness correction table and it reads out the brightness correction value $\Delta B_V$ from the brightness correction table in accordance with the abovementioned mentioned measured brightness $B_{V(AV)}$, object distance and lens focal distance (Step 130). That is, in the brightness correction table 130, there is stored such brightness correction value $\Delta B_V$ as shown in FIG. 3 with the measured brightness $B_{V(AV)}$ and sensor ratio K as the addresses thereof, and thus the corresponding brightness correction value $\Delta B_V$ is read out in accordance with the measured brightness $B_{V(AV)}$ and sensor ratio K. It should be noted here that the sensor ratio K can be found from the object distance and lens focal distance, as mentioned above.

In Step, 140, the measured brightness $B_{V(AV)}$ and brightness correction value $\Delta B_V$ are added together to thereby correct the measured brightness in the flash synchronization photographing.

In Step 150, the above-mentioned corrected brightness $B_V$ is added to the sensitivity of an image pickup element (speed value) $S_V$ to thereby find an exposure value ($E_V$). Although in the illustrated embodiment the $S_V$ is a constant value due to use of the CCD 18, in a camera using a film, the $S_V$ may vary according to the sensitivities of films used.

Figure 5:
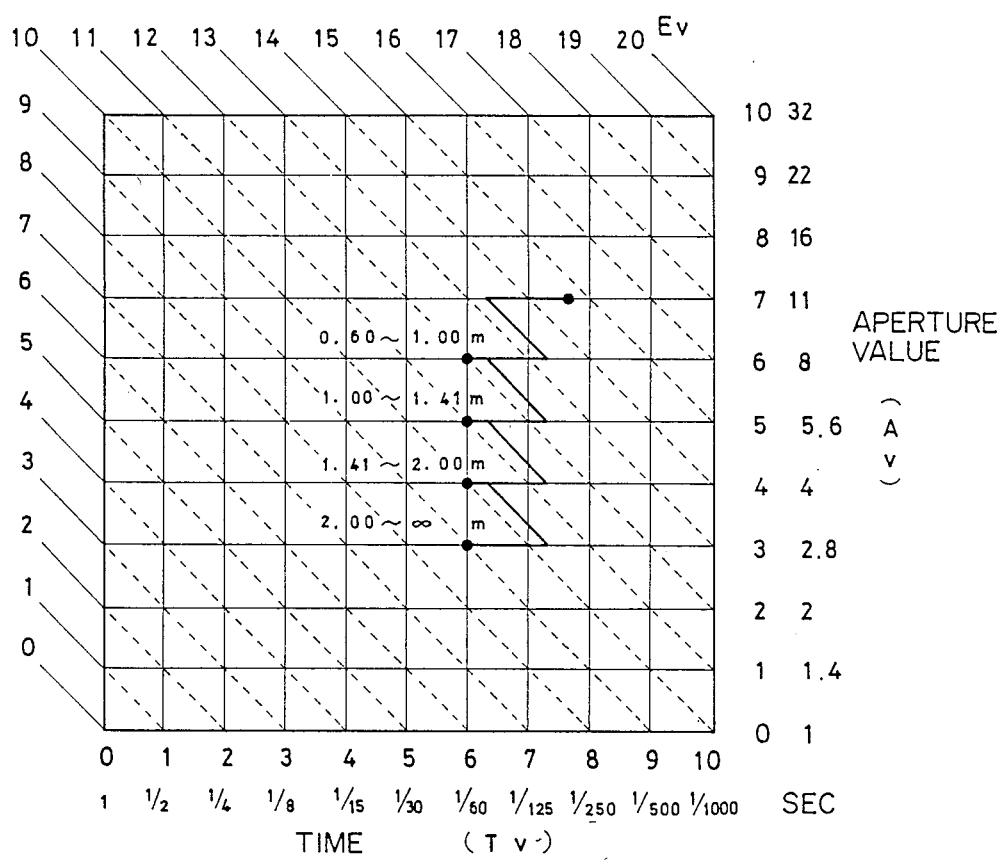

When the $E_V$ is determined in the above-mentioned manner, then the aperture value $A_V$ and shutter speed or time value $T_V$ are calculated according to a program shown in FIG. 5, in which the aperture can be changed in multiple stages. Here, as shown in FIG. 5, the aperture value $A_V$ can be changed in 5 steps from 3 to 7, and the time value $T_V$ can be changed from 6 to 7 and up to 7 successively so as to be able to correspond to the exposure value $E_V$. And, for the aperture value $A_V$, there is set a limit by the object distance.

In other words, in Step 170, an aperture value $A_{V1}$ is calculated in accordance with the exposure value $E_V$ found in Step 150. When the aperture value $A_{V1}$ is larger than an exposure value which is limited by the distance of an object, then the exposure value $A_{V1}$, as it is, is employed as the exposure value $A_V$. When $A_{V1}$ is equal to or less than $A_{V0}$, $A_{V0}$ is employed as $A_V$.

The reason why the aperture value $A_V$ is limited by the object distance is to prevent reduction of an amount of flash light of a strobe light when the object distance is a close distance. Referring in concrete to the calculation of the aperture value $A_V$ and time value $T_V$ in connection with FIG. 5, for example, when the exposure value $E_V$ is 12, normally $A_V=5$ and $T_V=7$ are selected. However, when the object distance is 0.60~1.00 m, then the aperture value $A_V$ is limited to 6 or more and thus $A_V=6$ and $T_V=6$ are selected, respectively.

And, in Step 180, the time value $T_V$ is calculated as discussed above, and in Step 190 the strobe light emitting level is selected in accordance with the aperture value $A_V$ and speed value $S_V$.

In the above-mentioned manner, the aperture value $A_V$, time value or shutter speed $T_V$ and strobe light emitting level STL are obtained, and the diaphragm 12, shutter 16 and strobe light 50 (FIG. 2) are controlled by the above-mentioned values and level.

As has been described hereinbefore, in the mentioned and device for measuring the object brightness according to invention, the measured brightness of the AE sensor to perform the averaged overall light reading can be corrected to a proper value in the flash synchronization photographing, so that, for example, in the day light flash synchronization photographing, excessive exposure can be prevented to thereby achieve an excellent photographing.

It should be understood, however, that there is no intention to limit the invention to the specific forms disclosed, but on the contrary, the invention is to cover all modifications, alternate constructions and equivalent falling within the spirt and scope of the invention as expressed in the appended claims.

What is claimed is:

1. A method of measuring the brightness of an object in photographing the object in flash synchronization by use of an AE sensor performing an average overall light reading operation, said method comprising:

a first step of measuring a measured brightness $B_{V(AV)}$ by means of said AE sensor and also detecting the distance of said object and the focal distance of a taking lens.

a second step of determining a sensor ratio pertaining to a ratio of an expected area occupied by said object to a total light receiving surface area of said AE sensor in accordance with said detected object distance and taking lens focal distance;

a third step of finding a brightness correction value $\Delta B_V$ in accordance with said sensor ratio found in said second step and said measured brightness $B_{V(AV)}$ measured by said AE sensor; and, a fourth step of adding together said measured brightness $B_{V(AV)}$ measured by said AE sensor and said brightness correction value $\Delta B_V$ found in said third step to find the brightness $B_V$ of said object.

2. The brightness measuring method of claim 1, wherein said second step of determining said sensor ratio comprises determining a magnification in accordance with said distance of said object and said focal distance of said taking lens, and determining said sensor ratio from said magnification in accordance with pre-stored data correlating said sensor ratio to said magnification.

3. The brightness measuring method of claim 2, wherein said brightness correction value $\Delta B_V$ is a positive value which increases as said sensor ratio and said measured brightness $B_{V(AV)}$ of said AE sensor increase.

4. The brightness measuring method of claim 2, wherein said brightness correction value $\Delta B_V$ is a negative value which increases as said sensor ratio increases and said measured brightness $B_{V(AV)}$ of said AE sensor decreases.

5. A device for measuring the brightness of an object, comprising:

an AE sensor for measuring a measurement brightness by means of an averaged overall light reading method;

distance measuring means for measuring the distance of said object;

detecting means for detecting the focal distance of a taking lens;

first operation means for determining a sensor ratio pertaining to a ratio of an expected area occupied by said object to a total light receiving surface area of said AE sensor in accordance with said object distance and taking lens focal distance respectively from said distance measuring means and detecting means;

second operation means for finding a brightness correction value $\Delta B_V$ in accordance with said sensor ratio and also with said measurement brightness $B_{V(AV)}$ measured by said AE sensor; and, third operation means for adding together said measurement brightness $B_{V(AV)}$ measured by said AE sensor and said brightness correction value $\Delta B_V$ found by said second operation means to thereby find the brightness $B_V$ of said object in photographing said object in flash synchronization.

6. The brightness measuring device of claim 5, wherein said first operation means comprises means for determining a magnification in accordance with said distance of said object and said focal distance of said taking lens, and means for determining said sensor ratio from said magnification in accordance with prestored data correlating said sensor ratio to said magnification.

7. The brightness measuring device of claim 6, wherein said second operation means comprises a brightness correction table for storing values of said brightness correction value $\Delta B_V$, said table being addressable by said sensor ratio and said measurement brightness $B_{V(AV)}$, said brightness correction value $\Delta B_V$ being a positive value which increases as said sensor ratio and said measured brightness $B_{V(AV)}$ of said AE sensor increase.

8. The brightness measuring device of claim 6, wherein said second operation means comprises a brightness correction table for storing values of said brightness correction value $\Delta B_V$, said table being addressed by said sensor ratio and said measurement brightness $B_{V(AV)}$, said brightness correction value $\Delta B_V$ being a negative value which increases as said sensor ratio increases and said measured brightness $B_{V(AV)}$ of said AE sensor decreases.

* * * * *